US00RE38930E

(19) United States
(12) Reissued Patent
Swartwood et al.

(10) Patent Number: US RE38,930 E
(45) Date of Reissued Patent: Jan. 10, 2006

(54) KNIFE HOLDER FOR A CHIPPER DISC

(75) Inventors: Troy M. Swartwood, Tualatin, OR (US); Douglas O. Keller, Clackamas, OR (US); Loren R. Schuh, Battle Ground, WA (US)

(73) Assignee: Key Knife, Inc., Tualatin, OR (US)

(21) Appl. No.: 09/705,379

(22) Filed: Nov. 3, 2000

Related U.S. Patent Documents

Reissue of:
(64) Patent No.: 5,979,522
Issued: Nov. 9, 1999
Appl. No.: 09/705,379
Filed: Nov. 3, 2000

(51) Int. Cl.
*B27C 1/00* (2006.01)
*B02C 18/00* (2006.01)

(52) U.S. Cl. ..... 144/176; 144/162.1; 144/218; 144/230; 144/241; 241/92; 241/189.1; 241/298; 407/113; 407/41

(58) Field of Classification Search ..... 144/162.1, 144/172, 174, 176, 218, 230, 235, 241; 241/92, 241/189.1, 228.1, 291, 296, 298; 407/47–51, 407/91, 107.109, 113
See application file for complete search history.

(56) References Cited

U.S. PATENT DOCUMENTS

| | | | | |
|---|---|---|---|---|
| 3,542,302 A | | 11/1970 | Salzmann, Jr. | |
| 3,572,594 A | | 3/1971 | Kershaw | |
| 3,777,793 A | | 12/1973 | Miller | |
| 3,981,337 A | | 9/1976 | Sundstrom | |
| 4,047,670 A | | 9/1977 | Svensson | |
| 4,082,127 A | | 4/1978 | Miller | |
| 4,139,034 A | | 2/1979 | Chapman | |
| 4,155,384 A | | 5/1979 | Svensson | |
| 4,194,545 A | * | 3/1980 | Kostermeier | 144/230 |
| 4,220,186 A | * | 9/1980 | Sybertz | 144/230 |
| 4,271,882 A | | 6/1981 | Valo | |
| 4,298,044 A | | 11/1981 | Hansel et al. | |
| 4,335,650 A | | 6/1982 | Prevot | |
| 4,346,744 A | | 8/1982 | Beer et al. | |
| 4,423,758 A | | 1/1984 | Haller et al. | |
| 4,685,497 A | | 8/1987 | Mierau et al. | |
| 4,694,995 A | | 9/1987 | Holmberg et al. | |
| 5,271,442 A | | 12/1993 | Carpenter et al. | |
| 5,485,873 A | | 1/1996 | Crammond | |
| 5,782,278 A | | 7/1998 | Larsson | |
| 5,819,826 A | | 10/1998 | Schmatjen | |

FOREIGN PATENT DOCUMENTS

| | | |
|---|---|---|
| DE | 73 35 031 U | 12/1977 |
| DE | 35 17 236 A | 11/1986 |
| WO | PCT/US99/27620 | 11/1999 |

OTHER PUBLICATIONS

Description of 6/36 Disc Waferizer Knives (Nov. 13, 1979).
Drawing of Key Knife commercial embodiment.

* cited by examiner

*Primary Examiner*—Allen Ostrager
*Assistant Examiner*—Shelley Self
(74) *Attorney, Agent, or Firm*—Birdwell & Janke, LLP

(57) ABSTRACT

An improved knife holder for a chipper disc. A knife holder for boding a knife has a first clamping portion and a second clamping portion for clamping the knife therebetween. One of the clamping portions pivots about a pivot point for clamping the knife and for releasing the knife so that it may be easily removed from the knife holder. In the relative position of the clamping portions in which the knife is clamped and in their relative positions in which a space is opened up around the knife permitting its removal, the clamping portions are rigidly disposed with respect to one another.

11 Claims, 2 Drawing Sheets

KNIFE HOLDER FOR A CHIPPER DISC

Matter enclosed in heavy brackets [ ] appears in the original patent but forms no part of this reissue specification; matter printed in italics indicates the additions made by reissue.

BACKGROUND OF THE INVENTION

The present invention relates to an improved knife holder for a chipper disc or film apparatus for producing chips or flakes from a piece of wood.

It is common to form chips for producing wood pulp for use in the manufacture of paper products, employing apparatus known as chippers a choppers, and to produce flakes or wafers for use in the manufacture of waferboard or oriented strand board, employing similar apparatus known as waferizers and stranders. All of these apparatus employ a disc rotating in the vertical plane and having one or more knives attached to knife holders disposed so that cutting edges thereof extend beyond the face of the disc. A piece of wood is fed against the face of the disc and the knives, so that cuts are made in the wood, producing the chips or flakes. The knives experience, very large forces and must be held firmly in place.

However, the knives must be removable from the knife holder, for reversing a replacing them. It has been a problem to ensure firm attachment of the knives while providing for their easy removal from the knife holders.

As a response, Holmberg et al., US. Pat. No. 4,694,995, proposes a knife holder that includes a filler piece fitting into a recess in the chipper disc, and a cassette for holding the knife. The cassette has a top and bottom part that clamps the knife therebetween and a fastener is inserted through the top and bottom parts that extends into the filler piece but not into the chipper disc. The filler piece is separately fastened to the chipper disc. Though it is as explained in the patent, the filler piece is a relatively large and heavy component, while the top part is relatively small and light. It is proposed that the knife may be removed simply by moving the fastener for the cassette and by lifting the small, light top part, while the larger, heavier filler piece remains fixed to the chipper disc. It is also proposed that the fastener for the cassette may be loosened to remove the knife.

Whether the fastener for the cassette of Holmberg is removed entirely or merely loosened, the top part of the cassette and the knife become loose and at least the top part must be moved to get at the knife. As the knife is heavy and difficult to handle and it is desirable to be able to use two hands for this purpose, the aforementioned requirement imposed by Holmberg is objectionable. Moreover, to the extent that the fastener for the cassette of Holmberg is smaller and lighter, it is capable of exerting less force on the knife than prior art fasteners for knife holders so that the knife is not held as firmly.

Accordingly, them is a need for an improved knife holder for a chipper disc or the like that provides for easier removal of a knife held thereby while providing for more firmly holding the knife during operation of the apparatus.

SUMMARY OF THE INVENTION

An improved knife holder for a chipper disc or the like according to the present invention solves the aforementioned problems and meets the aforementioned needs by providing a knife holder for holding a knife having a top and bottom side. The knife holder has a first clamping portion and a second clamping portion for clamping the knife therebetween. One of the clamping portions pivots about a pivot point for clamping the knife, and for releasing the knife, so that it may be easily removed from the knife holder. In the relative position of the firsts and second clamping portions in which the knife is clamped and in their relative positions in which a space is opened up around the knife permitting its removal, the first and second clamping portions are rigidly disposed with respect to one another.

Preferably, the pivoting clamping portion is employed as a lever with the pivot point functioning as a fulcrum for the lever. An applied force applied to the lever is multiplied at the knife to ensure that the knife is firmly held in place with a minimum amount of the applied force.

Therefore, it is a principal object of the present invention to provide a novel and improved knife holder for a chipper disc or the like and method.

It is another object of the present invention to provide such a knife holder and method that provides for increased ease of removing the knife from the knife holder.

It is yet another object of the present invention to provide such a knife holder and method that provides for removing the knife without removing other parts of the knife holder.

It is still another object of the present invention to provide such a knife holder and method that provides for holding the knife with increased firmness and with decreased applied force.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

A knife holder according to the present invention is particularly adapted for attachment to chipper or waferizer discs and drums for cutting wood chips or flakes from pieces of wood, such as whole logs, lumber and waste wood. The application, however, is not essential to the invention.

Figure 1:
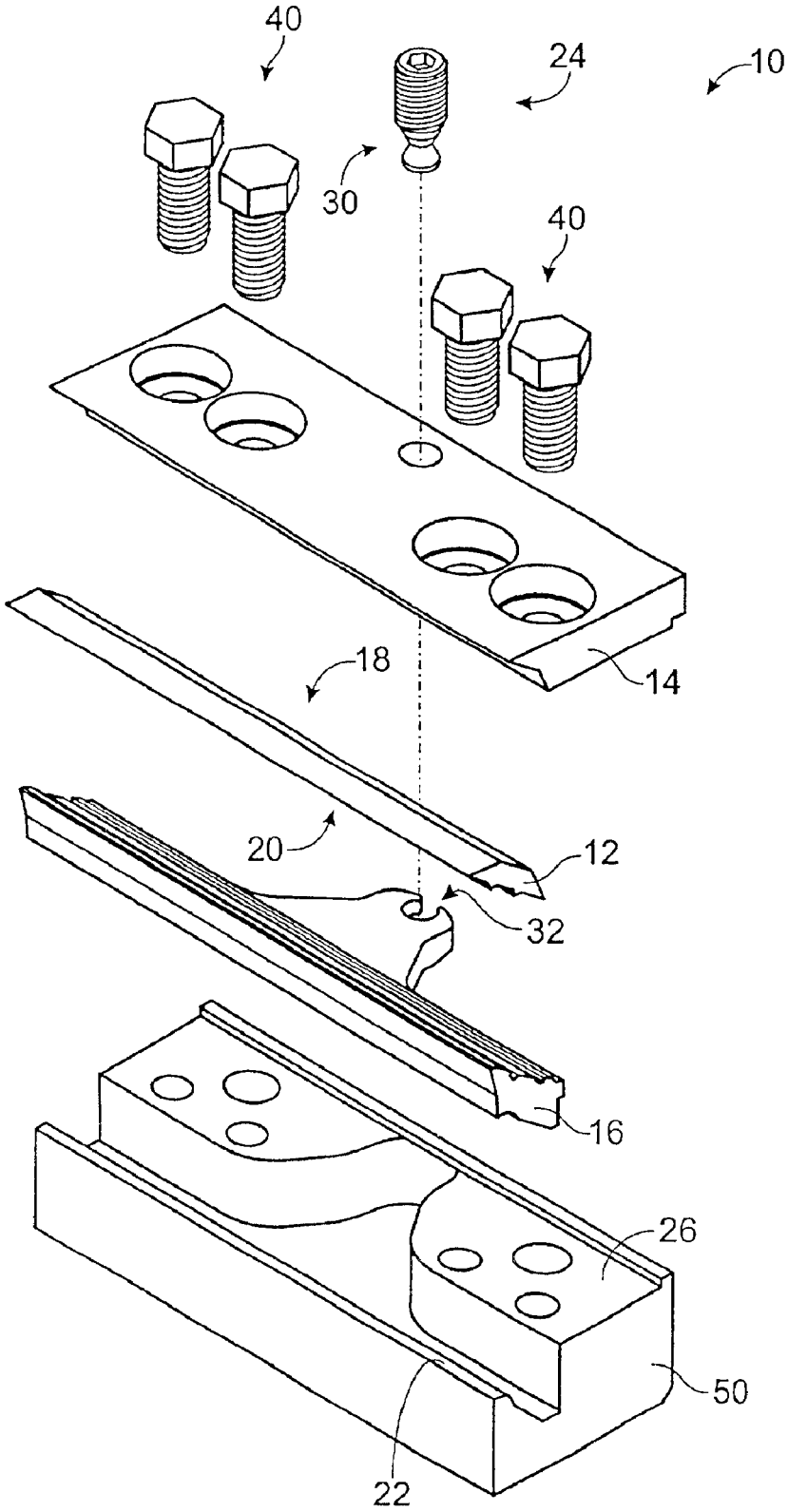
FIG. 1 is a pictorial, exploded view of the knife holder of FIG. 1.

Referring to FIG. 1, a preferred, disc embodiment of the invention is shown. The knife holder 10 is adapted to receive an existing removable knife 12 which may have a number of different shapes. For receiving the knife 12, the knife holder includes a top clamping portion 14 and a bottom clamping portion 16. Each of the clamping portions is shaped to fit the knife. Particularly, the top clamping portion is shaped to fit a top surface 18 of the knife and the bottom clamping portion is shaped to fit a bottom surface 20 of the knife.

The top clamping portion 14 is rigidly attached to a base 50 by bolts 40. The top clamping portion is seated on a ledge 26 so as to space the top clamping portion above the base. The bottom clamping portion 16 is disposed in the space provided between the top clamping portion and the base.

Figure 2:
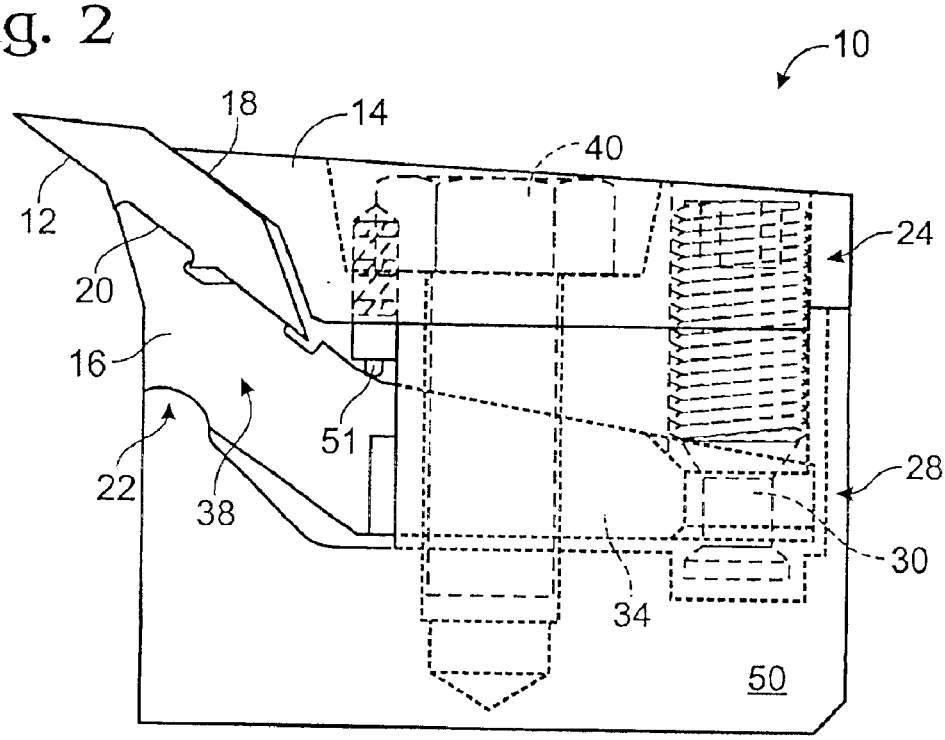
FIG. 2 is a cross-sectional view or a knife holder for a chipper disc or the like according to the present invention, in a position showing a knife being clamped.
Figure 3:
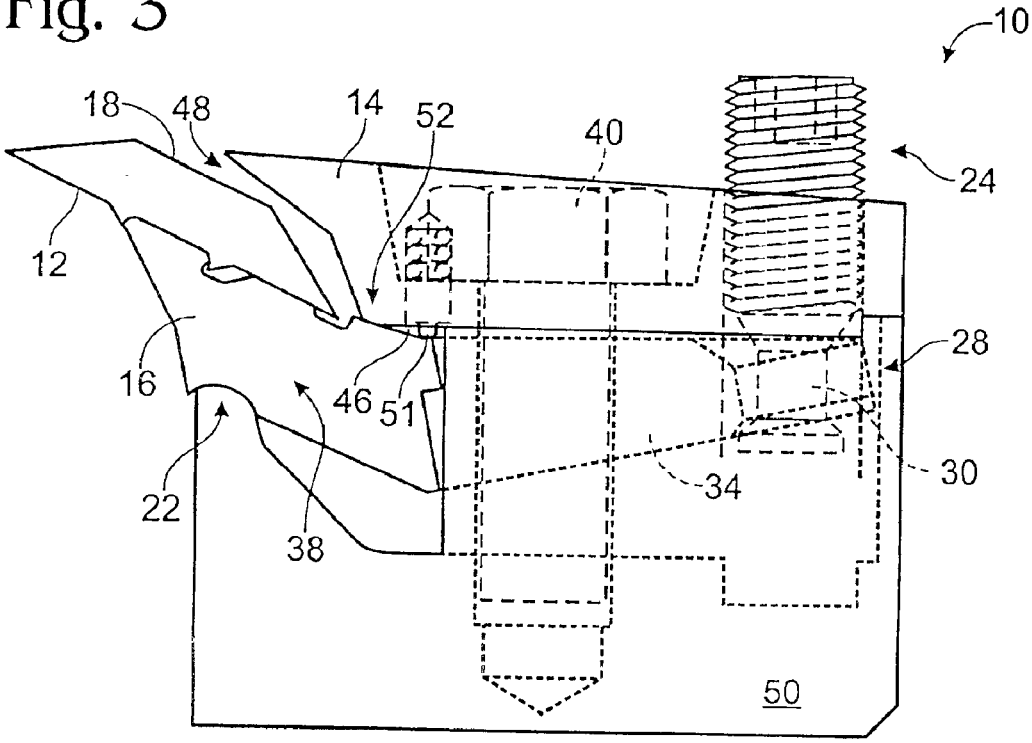
FIG. 3 is a cross-sectional view of the knife holder of FIG. 1, in a position showing the knife being released.

Turning to FIGS. 2 and 3, the knife holder 10 is shown in two states of operation, corresponding to two relative positions of the top and bottom clamping portions. In FIG. 2, in a clamping position of the clamping portions, the clamping portions clamp the knife. In FIG. 3, in an open position of the clamping portions, the knife is exposed for removal or cleaning. To provide for both states of operation, the bottom clamping portion 26 is adapted to pivot about a pivot point 22 on the base 50, and to clamp the knife against the top clamping portion by this action. It should be understood throughout that the roles of the top and bottom clamping portions may be reversed without departing from the principles of the invention.

Pivoting of the bottom clamping portion 16 is driven by a clamping machinists 24. The clamping mechanism is coupled to the top clamping portion 14 so that the clamping mechanism can translate with respect thereto. The clamping mechanism is connected to the bottom clamping portion with a suitable joint for maintaining the connection during translation of the clamping mechanism.

As illustrated in FIGS. 2 and 3, the pivot point 22 is preferably part of a rounded surface 23 of the base 50, and the bottom clamping portion 16 preferably includes a complementary rounded surface 25. Also as illustrated, preferably, the rounded surface 23 is circular and moves and the rounded surface 25 is circular and concave; however, one of ordinary skill in the art will readily appreciate that other curved surfaces could be employed as well as that the surfaces which are selected to be concave and convex could be reversed. As too be seen by comparing FIGS. 2 and 3, the surface 25 is disposed so as to make movable contact with the base 50, preferably, sliding on the surface 23 in response to movement of the clamping mechanism 24.

Preferably, the clamping mechanism 24 is threadingly received in a hole through the top clamping portion 14. An end 28 of the clamping mechanism extends beyond the top clamping portion toward the bottom clamping portion 16. The end 28 has a neck portion 30 that is received in a groove 32 (best seen is FIG. 1) is the bottom clamping portion to form the aforementioned joint. Alternative constructions and configurations of the clamping mechanism and its coupling with the bottom clamping portion will be apparent to those of ordinary skill in the art.

Force applied by the clamping mechanism for pivoting the bottom clamping portion is provided through the end 28. Threading the clamping mechanism so as to move it upwardly or downwardly in the top clamping portion 14 pulls or pushes a driving end 34 of the bottom clamping portion 16 in the same direction.

The bottom surface 20 of the knife 12 is received by a driven end 38 of the bottom clamping portion. In turn, the driven end moves in response to movement of the driving end 34, preferably in the opposite direction as a result of pivoting of the bottom clamping portion 16 about the pivot point 22. The top clamping portion 14 and the bottom clamping portion 16 clamp the knife therebetween in the clamping position of the clamping portions that provides a minimum spacing equal to the thickness dimension of the knife, as shown in FIG. 2. In the clamping position of the clamping portions, the clamping mechanism is threaded into the top clamping portion and is disposed toward the base 50 a maximum amount.

As the clamping mechanism 24 is threaded out of the top clamping portion 14, the clamping mechanism pulls the driving end 34 of the bottom clamping portion 16 away from the base. At a maximum amount of travel of the driving end 34, a maximum space 48 is seated around the knife to permit access thereto for removal or cleaning.

Pinch-off surfaces 52 are provided-on the top and bottom clamping portions that are adapted to meet one another when the top and bottom clamping portions tie spaced the maximum relative amount. The meeting of the surfaces 52 serves two functions. First, in conjunction with the connection of the driving end 34 to the clamping mechanism 24, this immobilizes the bottom clamping portion with respect to the top clamping portion, wedging the second clamping portion between the top clamping portion and the base, i.e., between the pinchoff surfaces and the pivot point 22. This provides the outstanding advantage of allowing the knife to be removed without the need to hold or handle any of the other parts of the knife holder at the same time. A spring-biased plunger mechanism 51 is preferably also provided to ride the bottom clamping portion 16 during its travel and thereby control movement of the bottom clamping portion between the open and clamping relative positions.

A second function of the pinch-off surfaces 32 is that open space 46 that exists behind the knife is cut off from the space 48 for accessing the knife, so that objects within the space 48, such as portions of the upper and lower clamping portions and the knife, can be cleaned without introducing debris into the open space 46, which is generally difficult to clean. For example, the space 48 can be blown with compressed air without forcing debris into the open space 46. The pinch-off surfaces, however, need not provide for both of the aforementioned functions.

Preferably, the bottom clamping portion 16 is configured as a lever for multiplying the force that is applied by the clamping mechanism 24 at the knife, to ensure that the knife 12 is firmly held with a minimum of force. In the geometry or FIG. 1, leverage is achieved by spacing the end 28 a greater distance from the pivot point 22 than is the knife 12.

It is to be recognized that, while a specific knife holder for a chipper disc has been shown and described as preferred, other configurations could be utilized, in addition to configurations already mentioned, without departing from the principles of the invention. For example, while the pivot point 22 and the top clamping portion 14 are sufficiently rigidly disposed with respect to one another to enable the knife 12 to be firmly clamped firmly between the top and bottom clamping portions, this does not preclude some compliance between the pivot point and top clamping portion. Similarly, though the pinch-off surfaces 52 may provide for maintaining the top and bottom clamping portions in substantially fixed relationship to one another in the open position of the clamping members, the pinch-off surfaces may also be suitably compliant. Moreover, though it is preferable to provide that the driven end counterbalances the driving end about the pivot point 22, this is not essential for practice of the invention.

The terms and expressions which have been employed in the foregoing specification are used therein as terms of description and not of limitation, and there is an intention of the use of such terms and expressions of excluding equivalents of the features shown and described or portions thereof, it being recognized that the scope of the invention is defined and limited only by the claims which follow.

We claim:

[1. A knife holder for holding a knife having a first side and a second side, the knife holder comprising:

a first clamping position adapted to receive the first side of the knife;

a second clamping portion adapted to receive the second side of the knife, said second clamping portion and said first clamping portion being adapted to clamp the knife therebetween in a first relative position of said clamping portions; and a clamping mechanism coupled to one of said first clamping portion and said second clamping portion and adapted for moving said one of said clamping portions so that said clamping portions obtain a second relative position wherein said clamping portions are spaced father sport than in said first relative position for removing the knife from between said clamping portions, wherein in both said first relative position and said second relative position of said clamping portions, said clamping portions are substantially fixedly maintained with respect to one another.]

[2. The knife holder of claim 1, further comprising a base, wherein said first clamping portion is fixedly disposed with respect to said base, wherein said second clamping portion is movably disposed with respect to said base, and wherein said clamping mechanism is coupled to said second clamping portion, and wherein, in both said first relative position and said second relative position of said clamping portions.]

[3. The knife holder of claim 2, wherein said base includes a pivot point, wherein said second clamping portion is adapted to pivot about said pivot point in response to movement of said clamping mechanism.]

[4. The knife holder of claim 3, wherein said first clamping portion and said second clamping portion include complementary pinch-off surfaces adapted to be spaced apart in said first relative position, and to make contact in said second relative position wherein, in cooperation with said pivot point, said pinchoff surfaces fixedly maintain said second clamping portion between said first clamping portion and said base.]

[5. The knife holder of claim 4, wherein said pinchoff surfaces are further adapted in said second relative position of said clamping portions to close off open space in the knife holder that is disposed behind the knife.]

[6. The knife holder of claim 3, wherein said clamping mechanism is coupled to said second clamping portion at a driving end of said second clamping portion, wherein said second clamping portion further includes a driven end adapted to receive at least a portion of the knife.]

[7. The knife holder of claim 6, wherein said second clamping portion and said base are adapted so that movement of said clamping mechanism pivots said second clamping portion about said pivot point so as to move said driving end substantially in one direction and said driven end substantially in the opposite direction.]

[8. The knife holder of claim 7, wherein said clamping mechanism is connected to said driving end and said second clamping portion is adapted so that said driving end is moved a greater distance than said driven end by said clamping mechanism.]

[9. The knife holder of claim 8, wherein said clamping mechanism includes a threaded fastener having an end, wherein said first clamping portion is adapted to threadingly receive said threaded fastener so that said end extends therebeyond for coupling to said second clamping portion.]

[10. A knife holder for holding a knife having a first side and a second side, the knife holder comprising:

a first clamping portion adapted to receive the flat side of the knife;

a second clamping portion adapted to receive the second side of the knife and to pivot about a pivot point;

a clamping mechanism coupled to said second clamping portion and adapted to pivot said second clamping portion about said pivot point for clamping the knife between said first and said second clamping portions; and a base including said pivot point, said second clamping portion being disposed so as to make movable contact with-said base.]

[11. The knife holder of claim 10, said first clamping portion being fixedly disposed above said base, said second clamping portion being disposed between said first clamping portion and said base, wherein said second clamping portion is adapted to pivot about said pivot point in response to movement of said clamping mechanism.]

[12. The knife holder of claim 10, wherein said second clamping portion includes a rounded surface and wherein said pivot point is part of a complementary rounded surface on which said rounded surface of said clamping portion is slidably disposed.]

13. A knife holder *for use with a base defining a pivot point* for holding a knife having a first side and a second side, the knife holder comprising:

a first clamping portion adapted to receive the first side of the knife;

a second clamping portion adapted to receive the second side of the knife and to pivot about [a] *said* pivot point; and a clamping mechanism coupled to said second clamping portion and adapted to pivot said second clamping portion about said pivot point for clamping the knife between said first and said second clamping portions, said first clamping portion being fixedly disposed above said base, said second clamping portion being disposed between said first clamping portion and said base, wherein said second clamping portion is adapted to pivot about said pivot point in response to movement of said clamping mechanism.

14. The knife holder of claim [18] *13*, wherein said first clamping portion and said second clamping portion include complementary pinch-off surfaces adapted to be spaced apart in [said] *a* first relative position, and to make contact in [said] *a* second relative position wherein, in cooperation with said pivot point, said pinch-off surfaces fixedly maintain said second clamping portion between said first clamping portion and said base.

15. The knife holder of claim 14, wherein said pinch-off surfaces are further adapted in said second relative position of said clamping portions to close off open space in the knife holder that is disposed behind the knife.

16. The knife holder of claim [18] *13*, wherein said clamping mechanism includes a threaded fastener having an end, wherein said first clamping portion is adapted to threadingly receive said threaded fastener so that said end extends beyond said first clamping portion for coupling to said second clamping portion.

[17. A knife holder for holding a knife having a first side and a second side the knife holder comprising:

a base including a pivot point;

a first clamping portion substantially fixedly disposed with respect to said base and adapted to receive the first side of the knife;

a second clamping portion movably disposed between said first clamping portion and said base and adapted to receive the second side of the knife, said second clamping portion and said first clamping portion being adapted to clamp the knife therebetween; and a clamping mechanism coupled to said second clamping portion at a driving end of said second clamping portion and adapted for moving said second clamping portion so that said clamping portions obtain a relative position wherein said clamping portions are spaced apart for removing the knife from between said clamping portions, wherein said second clamping portion further includes a driven end adapted to receive at least a portion of the knife, and wherein said second clamping portion and said base are adapted so that movement of said clamping mechanism pivots said second clamping portion about said pivot polar so as to move said driving end substantially in one direction and said driven end substantially in the opposite direction.]

[18. The knife holder of claim 13, wherein said clamping mechanism is adapted to pivot said second clamping portion about said pivot point to a first relative position of said clamping portions and wherein said second clamping portion is adapted to pivot about said pivot point in response to movement of said clamping mechanism to a second relative position of said clamping portions wherein said clamping portions are spaced farther apart than in said first relative position for removing the knife from between said clamping portions wherein both said first relative position and said second relative position of said clamping portions, said clamping portions are substantially fixedly maintained with respect to one another.]

*19. The knife holder of claim 16, wherein said first clamping portion and said second clamping portion include complementary pinch-off surfaces adapted to be spaced apart in a first relative position, and to make contact in a second relative position wherein, in cooperation with said pivot point, said pinch-off surfaces fixedly maintain said second clamping portion between said first clamping portion and said base.*

*20. The knife holder of claim 19, wherein said pinch-off surfaces are further adapted in said second relative position of said clamping portions to close off open space in the knife holder that is disposed behind the knife.*

*21. The knife holder of claim 14, wherein said clamping mechanism includes a threaded fastener having an end, wherein said first clamping portion is adapted to threadingly receive said threaded fastener so that said end extends therebeyond for coupling to said second clamping portion.*

*22. A chipping apparatus comprising:*

*a disc rotatable in a cutting plane;*

*a knife holder attached to said disc; and*

*at least one knife having a first side and a second side; said knife holder including a base defining a pivot point, a first clamping portion adapted to receive the first side of the knife, a second clamping portion adapted to receive the second side of the knife and to pivot about said pivot point and a clamping mechanism coupled to said second clamping portion and adapted to pivot said second clamping portion about said pivot point for clamping the knife between said first and said second clamping portions, said first clamping portion being fixedly disposed above said base, said second clamping portion being disposed between said first clamping portion and said base, wherein said second clamping portion is adapted to pivot about said pivot point in response to movement of said clamping mechanism.*

*23. The knife holder of claim 22, wherein said first clamping portion and said second clamping portion include complementary pinch-off surfaces adapted to be spaced apart in a first relative position, and to make contact in a second relative position wherein, in cooperation with said pivot point, said pinch-off surfaces fixedly maintain said second clamping portion between said first clamping portion and said base.*

*24. The knife holder of claim 23, wherein said pinch-off surfaces are further adapted in said second relative position of said clamping portions to close off open space in the knife holder that is disposed behind the knife.*

*25. The knife holder of claim 22, wherein said clamping mechanism includes a threaded fastener having an end, wherein said first clamping portion is adapted to threadingly receive said threaded fastener so that said end extends therebeyond for coupling to said second clamping portion.*

* * * * *